July 30, 1963 R. F. MURRAY 3,099,818

SCAN ELEMENT FOR COMPUTER

Filed June 30, 1959 5 Sheets-Sheet 1

INVENTOR
RICHARD F. MURRAY

BY Thomas & Crickenberger

ATTORNEYS

July 30, 1963 R. F. MURRAY 3,099,818

SCAN ELEMENT FOR COMPUTER

Filed June 30, 1959 5 Sheets-Sheet 2

July 30, 1963 R. F. MURRAY 3,099,818

SCAN ELEMENT FOR COMPUTER

Filed June 30, 1959 5 Sheets-Sheet 3

July 30, 1963 R. F. MURRAY 3,099,818

SCAN ELEMENT FOR COMPUTER

Filed June 30, 1959 5 Sheets-Sheet 4

United States Patent Office 3,099,818
Patented July 30, 1963

3,099,818
SCAN ELEMENT FOR COMPUTER

Richard F. Murray, Rhinebeck, N.Y., assignor to International Business Machines Corporation, New York, N.Y., a corporation of New York Filed June 30, 1959, Ser. No. 823,936
4 Claims. (Cl. 340—172.5)

Figure 1:
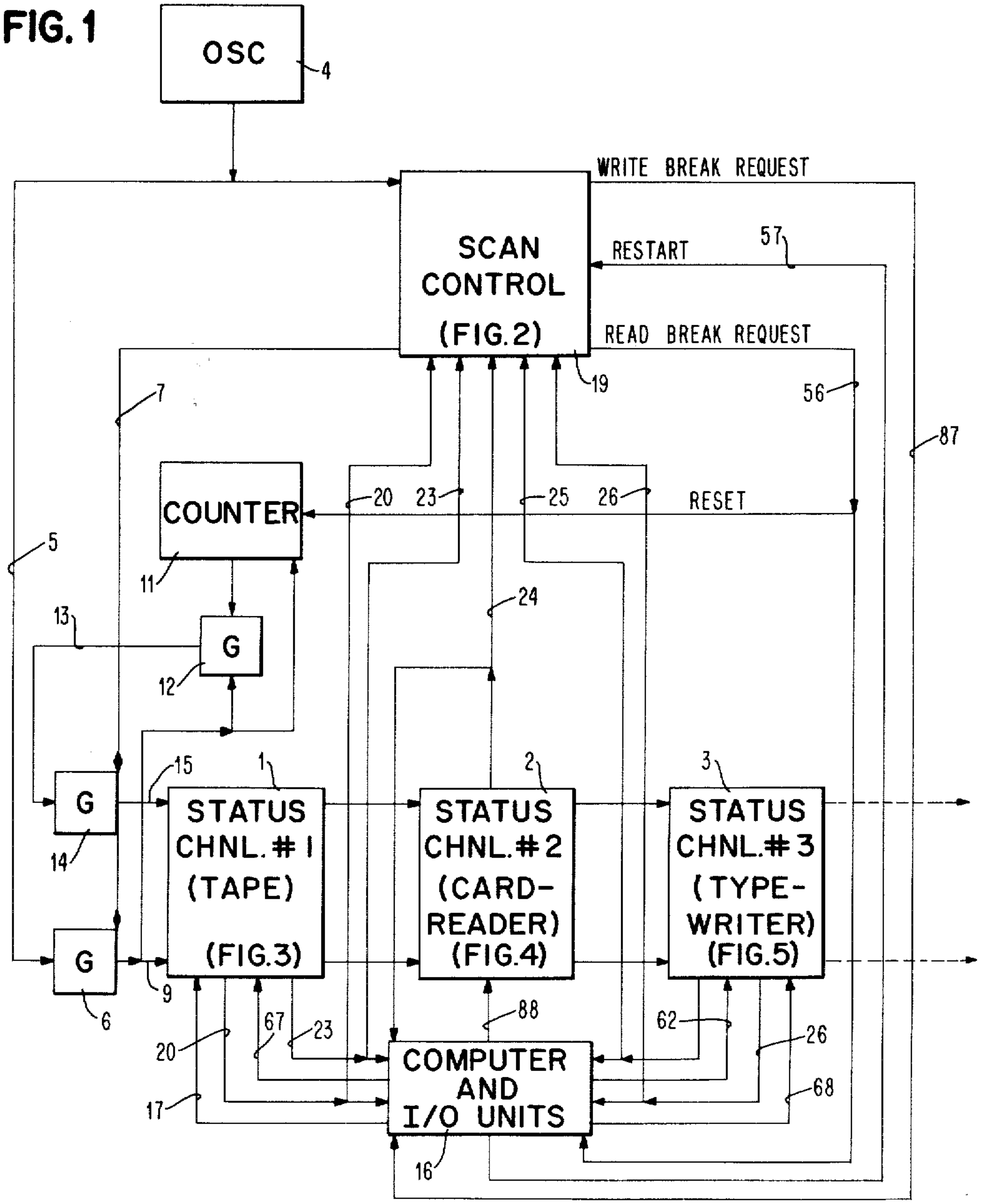

This invention relates to a device for controlling which one of a plurality of input-output devices may communicate with the central memory of a computing device, and more particularly to a device which gives precedence to the fastest operating input-output device over slower operating input-output devices when such input-output devices try to communicate with central memory of a computing device at the same time.

In one previously known scanning device a plurality of input-output units are sequentially interrogated. If the first unit interrogated is ready to communicate with the central computer memory, the unit is serviced. The next input-output device is interrogated and if it is ready to communicate with the computer, it is likewise serviced. The process continues until each unit has been interrogated. In case any unit is not ready to communicate with the computer when interrogated, it is skipped. Each input-output unit, however, is interrogated in sequence, and no particular input-output unit is given precedence over the other input-output units.

A scan element for a computing device is provided according to this invention which gives priority to input-output units which operate at higher speeds over input-output units which operate at slower speeds. According to this invention, first, second, third, etc. input-output units are provided, and the first input-output unit has a higher data rate than the second input-output unit. Likewise, the second input-output unit has a higher data rate or speed of operation than the third input-output unit. The third input-output unit has a higher data rate or speed of operation than the fourth and so forth. Actually, the first, second, third, fourth, etc. input-output units may consist of a plurality of units which operate at the same speed. In other words, a first group of input-output units having the same speed of operation are grouped together and given precedence over a second group of input-output units which are likewise grouped together. In case groups of such units are employed, the first input-output unit of any group is given precedence over other input-output units of the same group. In like fashion the second input-output unit of a given group takes precedence over the remaining input-output units of the same group. It is seen, therefore, that a group priority system is provided, and individual units of the same group likewise have a priority assignment.

When two or more input-output units are operative, their combined data rate must not exceed the data rate of the high speed computer memory, or information might be lost. In practice, the input-output units are exceedingly slow when compared to the speed of the central computer memory. It is customary, therefore, to employ a relatively large number of slow input-output units to supply information to and receive information from the central memory. The optimum compatibility between input-output units and high speed computer memories is approached as the data rate of all input-output units operating simultaneously approaches the data rate at which the high speed memory can receive, communicate this information to the computing device for processing and return the processed data to the input-output units.

According to one aspect of this invention, an oscillator supplies a train of pulses each pulse of which interrogates the first input-output unit, and if this unit is not ready to communicate with the central computer, the second input-output unit is interrogated. The interrogation continues in like fashion through the remaining input-output units. When all input-output units have been interrogated, the next oscillator pulse repeats the same process. Assuming for purposes of illustration that the second input-output unit is ready to communicate with the central computer when interrogated in this fashion, the oscillator pulse is terminated at the second input-output unit so that the remaining input-output units are not sampled by this oscillator pulse. The second input-output unit is serviced, and while it is being serviced, the oscillator is inhibited from generating interrogation pulses. It follows, therefore, that no other input-output unit may be interrogated and selected while the second input-output unit is being serviced. As soon as the second input-output unit is serviced, the oscillator pulses are again established, and interrogation of the first input-output unit, the second, third, etc. are interrogated in turn by each oscillator scan pulse until another input-output unit is ready to be serviced. When another input-output unit is ready to be serviced, it terminates the oscillator pulse which gives it precedence to communicate with the computer, and simultaneously the oscillator is turned off until servicing of this input-output unit is completed.

According to one arrangement of this invention a scan element is employed in a data processing system where the central processing system generates an instruction to select one of the input-output units to supply information to the central memory. After this instruction is generated, the central processing unit is free to carry out further instructions, and the selected input-output unit operates independently of the central processing unit. Assume, for example, that it is desired to transfer a plurality of words from a magnetic tape unit to the central memory of the data processing system. After the instruction is generated to select the proper tape unit, the central processor is then free to carry out further instructions. After selection of the given tape unit, this tape unit is started in motion and characters are read from the tape, usually one at a time until a complete computer word is formed. Once a complete word is formed, the tape unit signals the scan element that it desires to transfer a word to the central memory. Once this tape unit is selected by the scan element, a break request is signaled to the computer, indicating that the selected tape unit has a word ready for transfer to the central memory. When the central processing system accepts the break request, the word from the tape unit is transferred to the central memory.

The central processing system may select one or a plurality of input-output units to transfer to or receive information from the central memory. Assume for purposes of illustration that it is desired to transfer information into the central memory from both a tape and a typewriter. Appropriate instructions are generated to set these units in operation. Since the tape unit operates at a much greater speed than the typewriter, the tape unit may transfer a plurality of words to the central memory for each word transferred by the typewriter. This may be accomplished as follows. Enough characters are read from the tape into a tape buffer register to make up a full word for the central processing system, and a signal is generated to the scan element which in turn selects the tape. A break request is initiated, and the word is transferred to the central processing system where the break request is honored by the central processing system. Several of these operations may be performed before the typewriter has generated a full word in a typewriter buffer register. When a full word has been completed by the typewriter, it generates a signal to the scan element and is selected provided that the tape unit is not at that instant ready for a transfer operation. In other words, if the tape unit does not have a word ready for transfer at this instant, the scan element selects the typewriter to transfer its word to memory. A break request is then initiated, later accepted, and the typewriter word transferred. Suppose, however, that both the tape unit and the typewriter each have a word ready for transfer at the same time and that both of them generate a signal to the scan element simultaneously. The scan oscillator interrogates the tape unit first, and when the tape unit is selected by the scan element, the tape unit terminates this oscillator pulse so that the typewriter unit may not be selected. The tape unit also turns off the oscillator until its transfer operation is completed. The tape unit turns the oscillator on when the transfer is completed and the next scan pulse selects the typewriter unit. The typewriter unit terminates the oscillator pulse which selected it and turns the oscillator off. The typewriter unit retains control until its transfer operation is completed at which time the oscillator is turned on again. The tape unit and the typewriter continue to operate in a similar fashion until the proper number of words is transferred from each.

These and other objects of this invention may be more fully appreciated when considered in the light of the following descriptions and the drawings in which:

FIG. 1 illustrates in block form an exemplary arrangement of a scan element according to this invention, and FIGS. 2 through 5, when placed side by side in the order in which they are numbered, illustrate a more detailed wiring diagram of the circuits illustrated in FIG. 1.

Referring now to FIG. 1, a scan element according to the present invention is illustrated in block form with status channels 1, 2 and 3. An oscillator 4 supplies pulses on a line 5 to a gate 6. If no break operation is in process, a signal on line 7 conditions the gate 6 to pass the oscillator pulses to a line 9 which ripple through each of the status channels 1, 2, and 3 for the purpose of interrogating them and determining whether any input-output unit wishes to communicate with the computer. The pulses on line 9 are applied also to a 10 stage counter 11 and to a gate 12. When the counter reaches a full count, it conditions the gate 12 to pass a pulse from line 9 to line 13 which in turn is applied to a gate 14. If no break is in process, the level on line 7 conditions the gate 14, and the pulse on line 13 is applied on line 15. A pulse on this line ripples through each of the status channels 1, 2 and 3, and if a given channel is selected to communicate with the computer, this pulse is effective to inhibit further scan pulses from the oscillator from passing through the gate 6. In effect, a pulse on the line 15 serves to prevent further scanning operations if a given status channel is busy with a transfer operation. The counter 11 responds to 10 pulses from line 9 and conditions the gate 12 to pass the 10th pulse on line 13 to gate 14. It is seen, therefore, that line 15 is energized once for every 10 pulses that appear on the line 9. The block designated by the reference 16 includes a central processing system or a computer plus input-output units which may be employed to transfer information to the computer or receive information from the computer. The computing device and the input-output units which may be employed may be any one of various well known types of such equipment.

Figure 2:
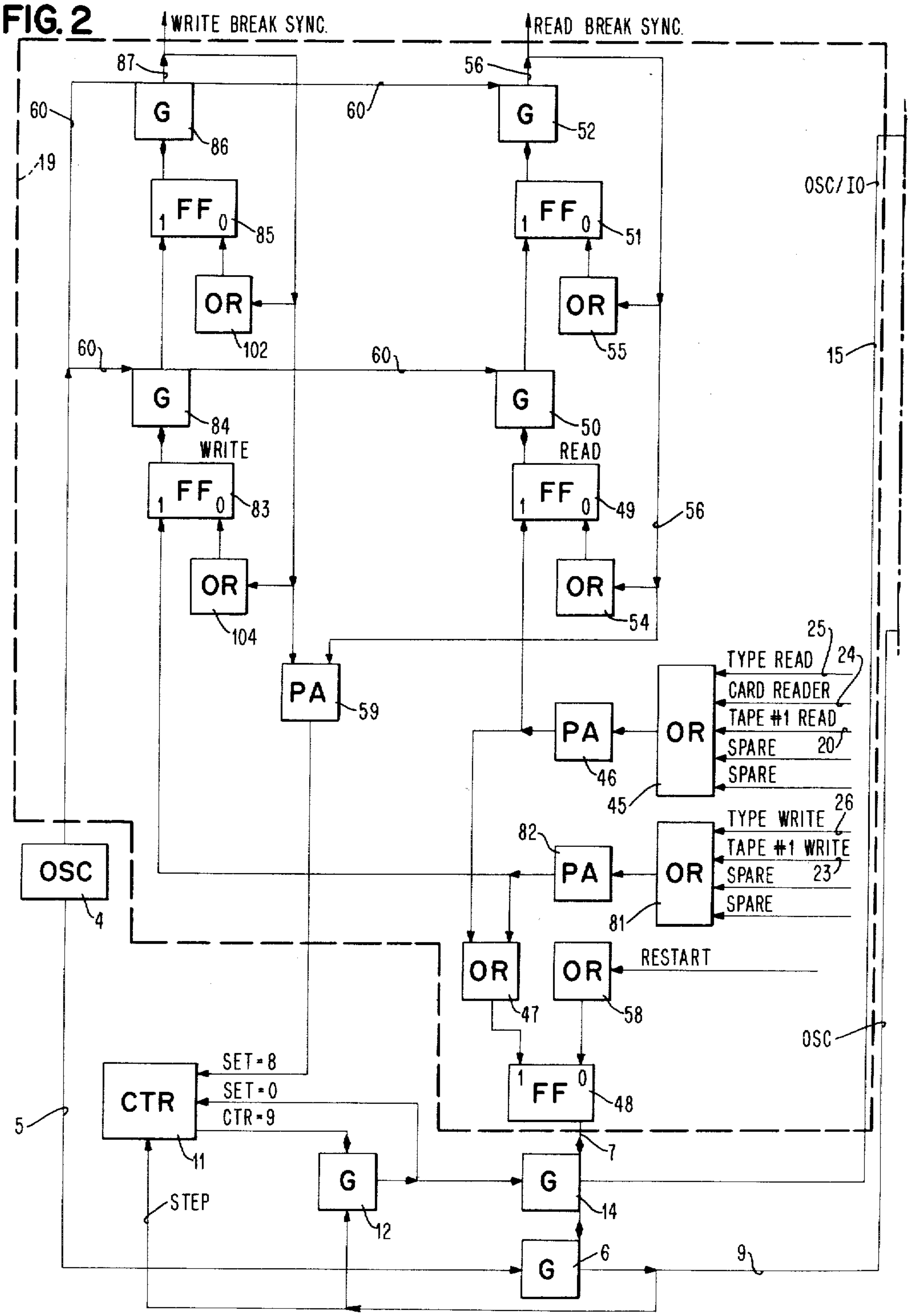

The logic of the scan control 19 in FIG. 1 is illustrated more specifically in FIG. 2. In addition, the oscillator 4, the counter 11 and gates 6, 12 and 14 of FIG. 1 are illustrated in FIG. 2 in conjunction with the more detailed illustration of the scan control 19 in this figure. Status channels 1, 2 and 3 of FIG. 1 are illustrated at the logic level in respective FIGS. 3, 4 and 5. It is pointed out that the status channel at FIG. 3 includes controls in the left portion of this figure for reading from an input unit to the central computer, and identical controls are provided in the right hand portion of this figure for transferring information during a writing operation from the computer to the intput-output unit. FIG. 5 has similar read controls in the left half portion and write controls in the right hand portion. FIG. 4 has a set of read controls but no write controls.

Figure 3:
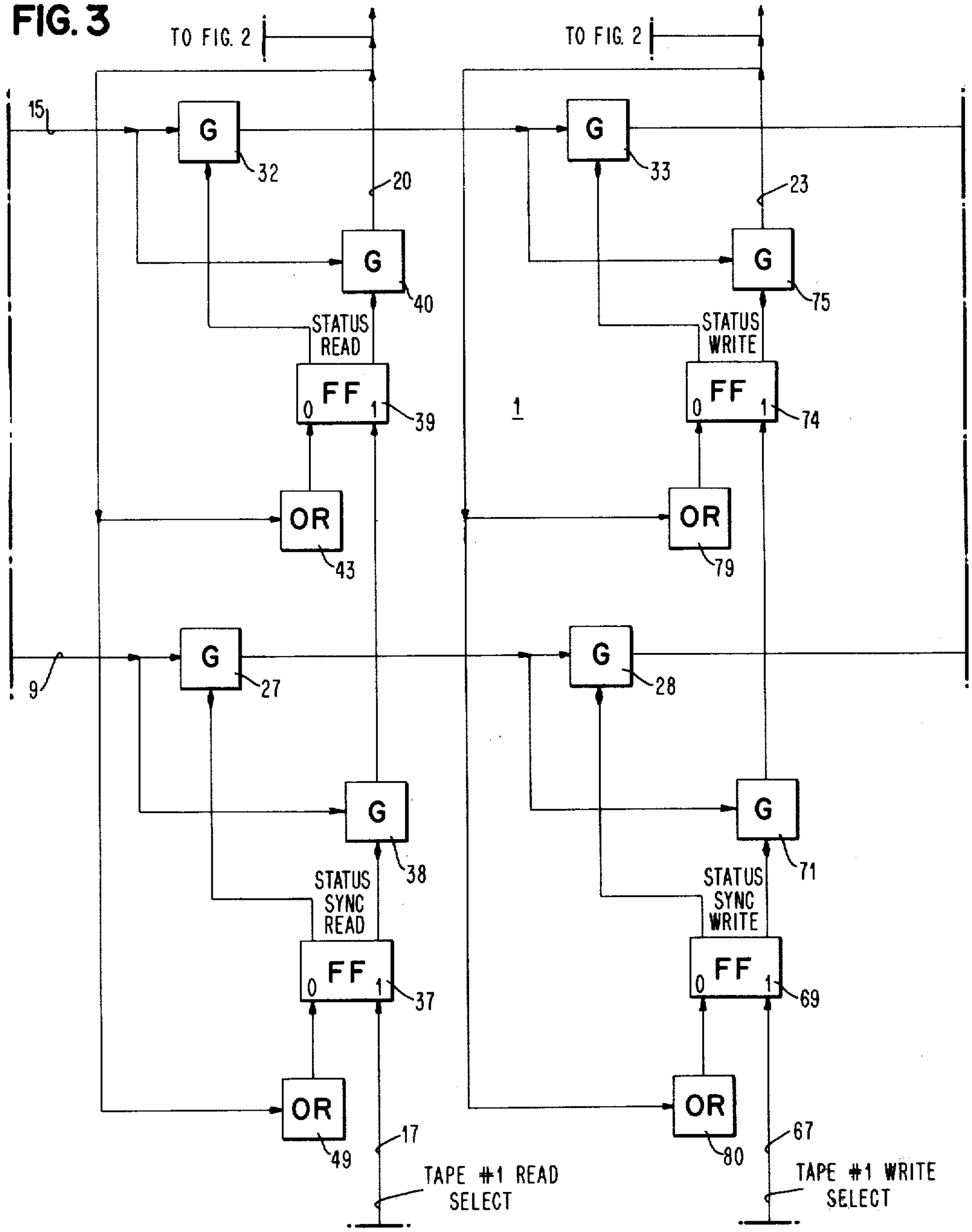
Figure 4:
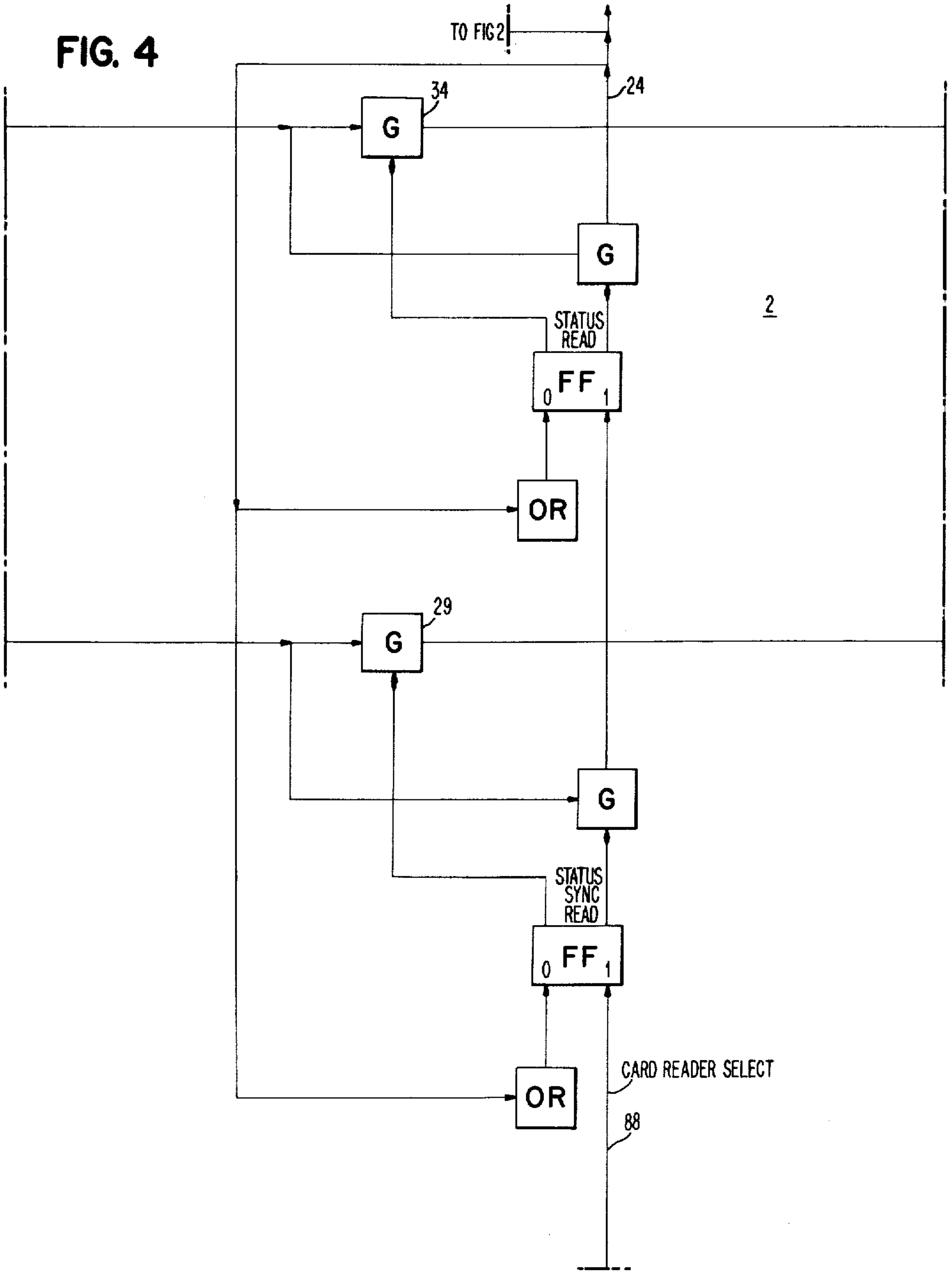
Figure 5:
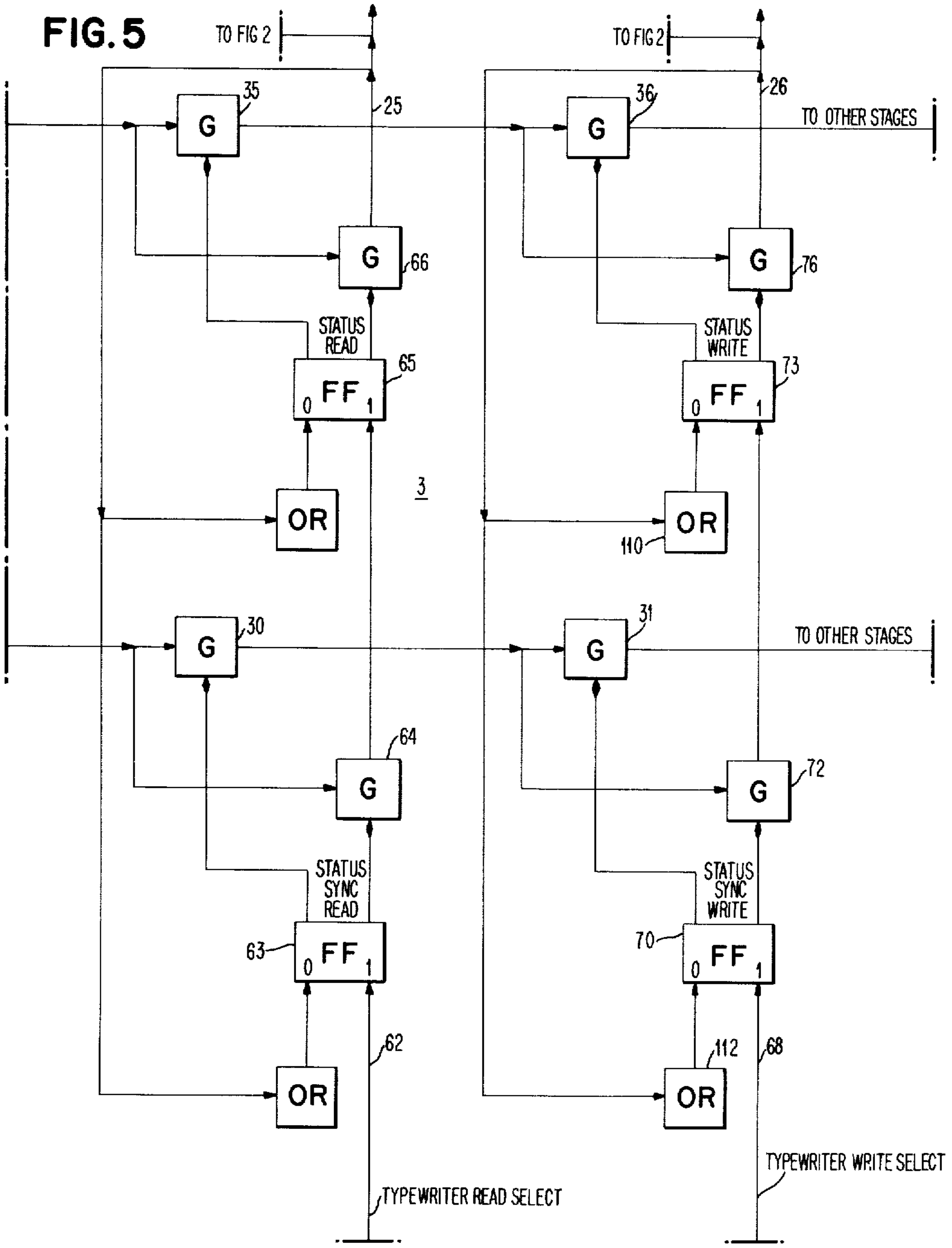

The operation of the control circuits illustrated in FIGS. 2 through 4 may best be understood by observing the events which take place when a read and a write operation are performed. Assume for purposes of illustration, that a tape unit controlled by status channel 1 is ready to transfer information to the computer. Both the tape unit and the computer are disposed in the block 16 in FIG. 1. When the tape unit has information available for transfer, the line 17 in FIG. 3 is energized. The signal on line 17 sets the flip-flop 37 to the One state and conditions the gate 38. The next scan pulse on the line 9 is passed by the gate 38 and applied to the One input of the flip-flop 39 This flip-flop is set to the One state and conditions the gate 40. This gate passes the next pulse on line 15, and the output pulse from the gate 40 is applied on line 20 to the OR circuits 49 and 43 and then to the Zero input sign of flip-flops 37 and 39. Consequently, the flip-flops 37 and 39 are set to the Zero state, thereby conditioning the gates 27 and 32. The output pulse on line 20 in FIG. 3 is applied to the computer 16 in FIG. 1 to signal that information is available for transfer from the tape unit associated with status channel 1. The pulse on line 20 in FIG. 3 is applied also to an OR circuit 45 in FIG. 2. The pulse from the OR circuit is applied through a pulse amplifier 46 to the One input side of a flip-flop 49 and through an OR circuit 47 to the One input side of a flip-flop 48. Consequently, both of these flip-flops are set to the One state. When flip-flop 48 is set to the One state, the gates 6 and 14 are deconditioned by the signal on line 7. Hence, no further oscillator pulses may be generated for scanning purposes. When the flip-flop 49 is set to the One state, the gate 50 is conditioned, and the next oscillator pulse on line 60 is passed to the One input side of a flip-flop 51. When this flip-flop is set to the One state, the gate 52 is conditioned and passes the next oscillator pulse on line 60. The output pulse from the gate 52 is applied on line 56 to the OR circuits 54 and 55 and then to the Zero input side of flip-flops 49 and 51. These flip-flops are thus set to the Zero state, thereby deconditioning the gates 50 and 52, respectively. The pulse on line 56 is applied through a pulse amplifier 59 to the counter 11 and serves to reset the counter. The pulse on line 56 in FIG. 2 is applied to the computer 16 in FIG. 1, and serves to signal the computer that the selected tape unit associated with status channel 1 is ready to transfer information to the computer. The computer honors this request and accepts the information from the tape unit, and when the information has been transferred from the tape unit, the computer emits a signal on line 57 in FIG. 1 to the scan control 19 in FIG. 1. This signal is applied to the OR circuit 58 in FIG. 2 and resets the flip-flop 48 to the Zero state, thereby conditioning the gates 6 and 14 to pass further oscillator pulses on lines 9 and 15. The pulses on line 9 pass through the gate 27, the gate 28, the gate 29 in FIG. 4, and the gates 30 and 31 in FIG. 5 provided that no input-output unit associated with status channels 1, 2 and 3 is ready to transfer information.

Assume for purposes of illustration that a signal is applied on line 68 to the One input side of the flip-flop 70 in FIG. 5. This indicates that the typewriter associated with status channel No. 3 is ready to type a word to be received from the computer 16 in FIG. 1. The flip-flop 70 is set to the One state and conditions a gate 72 to pass the oscillator pulse which passes the gate 30 in FIG. 5. The next oscillator pulse which passes the gate 30 is applied to the gate 72 and is passed to the One input side of the flip-flop 73, setting this flip-flop to the One state and conditioning the gate 76. Assume further that a signal is applied on line 67 in FIG. 3 to the One input side of the flip-flop 69. A signal on the line 67 indicates that the tape controlled by the status channel 1 is ready to write a word to be received from the computer 16 in FIG.

1. Let it be assumed that the flip-flop 69 is set to the One side, the gate 71 passes an oscillator pulse which sets the flip-flop 74 to the One side, and that the gate 75 is conditioned before an oscillator pulse is applied on line 15. Under these assumptions, the gate 76 in FIG. 5 was conditioned before the gate 75 in FIG. 3 was conditioned, but neither gate has at this point in time received a pulse on line 15 from FIG. 2. In this case, status channel 3 indicated a readiness to receive a word from the computer operating the typewriter associated with status channel 3, but before the scan control 19 in FIG. 1 was operated by the status channel 3, the status channel 1 in FIG. 1 indicates a readiness to receive a word from the computer to be written on the tape associated with status channel 1. By virtue of the priority control of this invention, status channel 1 takes precedence over status channel 2 which in turn takes precedence over status channel 3. Accordingly, when status channel 1 and status channel 3 both indicate a readiness to transfer or receive information, the status channel 1 is given precedence. The manner in which status channel 1 is given precedence is readily seen by noting that the next oscillator pulse on line 15 from FIG. 2 is applied through the gate 32 and is blocked by the gate 33 because flip-flop 74 is in the One state. Hence, this oscillator pulse is passed by the gate 75 to the line 23. The pulse on line 23 signals the computer that status channel 1 has been selected for the writing operation. The pulse on line 23 in FIG. 3 is applied to an OR circuit 81 in FIG. 2 and then through a pulse amplifier 82 and an OR circuit 47 to the One input sign of the flip-flop 48. When the flip-flop 48 changes to the One state, the signal on line 7 to gates 6 and 14 deconditions these gates and prevents further oscillator pulses from being developed on lines 9 and 15. It can be seen at this point, that the typewriter associated with status channel 3 remains ready to communicate with the computer, but it cannot be accepted by the scan control at this time because gate 14 is deconditioned, thereby preventing any further pulses on line 15 from rippling through status channels 1 through 3. The pulse on line 23 in FIG. 3 is applied to OR circuits 79 and 80 and resets respective flip-flops 74 and 69 to the Zero state, thereby conditioning associated gates 33 and 28, respectively. The write status control circuits in the right hand portion of FIG. 3 are accordingly reset to pass further scanning pulses. The pulse from the pulse amplifier 82 is applied also to the One input side of the flip-flop 83 in FIG. 2, and when this flip-flop changes to the One state, the gate 84 is conditioned. This gate passes the next oscillator pulse on line 60 and sets the flip-flop 85 to the One state, thereby conditioning the gate 86. This gate passes the next oscillator pulse on line 60. The output pulse from this gate is applied to OR circuits 102 and 104 to reset respective flip-flops 85 and 83 to the Zero state. The signal on line 87 is applied through a pulse amplifier 59 to the counter 11, and this signal resets the counter to hold a count of 8. The output pulse on line 87 in FIG. 2 is also applied to the computer 16 in FIG. 1 to initiate a break operation whereby the computer transfers information to the tape unit associated with status channel 1. Once this transfer is completed, the computer energizes line 57 in FIG. 1 to restart the scan element 19. The signal on line 57 in FIG. 1 is applied to the OR circuit 58 in FIG. 2 to set the flip-flop 48 to the Zero state and thereby condition the gates 6 and 14 to pass further oscillator pulses to interrogate status channels 1, 2 and 3 in FIGS. 3, 4 and 5, respectively.

It is recalled that the step counter 11 was set to 8 at the time a write break was initiated by a signal on line 87 in FIG. 2. Accordingly, when the gates 6 and 14 were conditioned after receiving a signal on line 57 in FIG. 2, an oscillator pulse from gate 6 is applied to line 9. This pulse steps the counter 11 to a count of 9 so that the next pulse from the gate 6 will pass through the gate 12 and gate 14 to line 15. The scan pulse from gate 6 on line 9 ripples through the gates 27 and 28 of FIG. 3, the gate 29 of FIG. 4, and the gate 30 of FIG. 5. The pulse from gate 30 passes through the gate 72 since the flip-flop 70 is still in the One state. The output pulse from the gate 72 is applied to the One input of flip-flop 73, but this pulse is uneventful since the flip-flop 73 is already in the One state as previously indicated. This assumes, of course, that the scan pulse on line 9 which passes through the status channels 1 and 2 finds no request from the input-output units associated with these channels to transfer information. The next oscillator pulse is passed by gates 16 and 14 because the step counter holds the count of 9 and conditions the gate 12. The simultaneous application of pulses to lines 9 and 15 causes a ripple-type sampling of gates 27 through 31 and gates 32 through 36 in FIGS. 3 through 5. The pulse on line 9 which ripples through the gates 27 through 29 serves to scan the status channels 1 and 2 while the ripple action of the pulse on line 15 through the gates 32 through 36 serves to select any status channel previously ready to communicate with the computer. Under the assumptions previously made, the write control portion of status channel 3 was previously selected and now remains selected. Hence, the gate 76 is conditioned to pass the pulse which ripples through the gates 32 through 35 to the gate 76. The output pulse from this gate is applied on line 26 to signal the computer 16 in FIG. 1 that status channel 3 has been selected for a write operation. The output pulse on line 26 is applied also to OR circuits 110 and 112. This causes the flip-flops 70 and 73 to be reset to the Zero state. The output pulse on line 26 is applied also to OR circuit 81 in FIG. 2, then through the pulse amplifier 82, then to the OR circuit 47 and to the One input of the flip-flop 48. When this flip-flop changes to the One state, the gates 6 and 14 are deconditioned and no further oscillator pulses are applied to the lines 9 and 15. The output pulse from the pulse amplifier 82 is applied to the One input side of the flip-flop 83 and the sequence of events which follow to perform a writing operation are the same as explained previously. When the writing operation is completed, a signal is received on line 57 from the computer 16 in FIG. 1 and this signal is applied to the OR circuit 58 in FIG. 2. This resets the flip-flop 48 to the Zero state and conditions gates 6 and 14 to pass oscillator pulses on lines 9 and 15.

Assume that a signal is applied on line 68. This indicates that the typewriter is ready to receive a word from memory and print the word. Assume further that a signal is applied on line 67 of FIG. 3 simultaneously with the application of a signal on the lead 68 of FIG. 5. The signal on lead 67 indicates that the tape unit is ready to write a word received from the memory. The simultaneous application of signals to lines 67 and 68 sets the flip-flops 69 and 70 to the One state. This causes the simultaneous deconditioning of gate 28 in FIG. 3 and gate 31 in FIG. 5. If an oscillator pulse on line 9 is present at the input to gate 28 at the time it is deconditioned, the pulse may be split. That is, the first portion of the pulse on line 9 passes through the gate 28 and onto the gate 29 of FIG. 4 before the gate 28 is deconditioned. The oscillator pulse on line 9 is also applied to the gate 71 of FIG. 3 and since this gate is conditioned by the flip-flop 69, the flip-flop 74 is set to its One state. The split pulse which passed through the gate 28 ripples through the gate 29 in FIG. 4 and the gate 30 in FIG. 5 to the gate 72. Since the flip-flop 70 is set, the gate 72 passes the signal from the gate 30 and sets the flip-flop 73. At this point the status write channels of status channels 1 and 3 have been selected as a result of the pulse splitting action of the gate 28 in FIG. 3. When the next pulse appears on line 15 it passes through the gate 32 and the gate 75 in FIG. 3 and causes this channel to be selected and its writing operation to be completed as previously explained. As soon as a restart signal is received on line 57 in FIG. 2 indicating that status channel 1 has completed its operation, the flip-flop 48 is set to its Zero condition, thereby conditioning the gates 14 and 6 to again pass pulses on to the lines 9 and 15. The first pulse on line 15 then passes through the gate 76 of FIG. 5 providing status channels 1 and 2 have not received a signal on one of the lines 17, 67 or 88. Accordingly, a pulse on line 26 from gate 76 is then applied to the OR gate 81 of FIG. 2 and initiates a writing operation in the manner previously described. Accordingly, it is seen that a pulse splitting action by one status channel and a consequent selection of a further status channel creates no difficulty in a scan element according to this invention. Regardless of how two or more channels are selected simultaneously, status channel 1 always takes precedence over status channels 2 and 3 and status channel 2 always takes precedence over status channel 3.

The read status channel of FIG. 4 operates in the same manner as the read status channels of FIGS. 3 and 5. Since it is possible to read from a card reader but not possible to transfer information from the computer memory back to the card reader, it is not necessary to have a write status channel for the card reader associated with the status channel of FIG. 4.

As indicated by the broken lines in FIGS. 1, 3 and 5, it is possible to add other status channels to the scan element. For example, other status channels may be inserted between FIGS. 3 and 4 for controlling other tape units. The arrangement is such that the faster units always receive priority over the slower units. The input-output units of the same speed are disposed to be controlled by adjacent status channels. The status channels are arranged from left to right in FIG. 1 with the faster input-output units being controlled by status channels to the left and proceeding to the right with successively slower input-output units being controlled by succeeding status channels to the right. Hence, the fastest input-output unit is disposed to be controlled by status channel 1, and the slowest input-output unit is disposed to be controlled by status channel 3. Input-output devices having speeds of operation intermediate the fastest and slowest input-output units are arranged in sequence from left to right in the order corresponding to their speed of operation. Such input-output units are controlled by corresponding status channels disposed between the first and third status channel.

The circuits illustrated in block form in FIGS. 2 through 5 may be any suitable ones of various well known circuits of this type. The flip-flops, the gates, and the OR circuits, may, for example, be of the type shown and described in copending application No. 824,105, filed June 30, 1959. The pulse amplifiers and the oscillator illustrated in block form in FIG. 2 may, for example, be of the type described in Patent No. 3,067,937, granted December 11, 1962.

What is claimed is:

1. In a data processing system wherein a plurality of input-output units may transfer data to or receive data from a central processor, the data processing device having a scan element disposed between the plurality of input-output units and the central processor, said scan element including a plurality of status channels serially connected to be sensed in turn by oscillator pulses applied to the first of said status channels, means for applying status signals from each input-output device to a separate status channel with status signals from the fastest input-output unit being applied to the first status channel and succeeding slower input-output units having their status signals applied to succeeding status channels in the series, a source of oscillator pulses, a controlled circuit connected to said source of oscillator pulses and to each of said status channels, said control circuit being normally operative to pass said oscillator pulses to said first status channel but operative in response to a signal from any of said status channels for blocking the passage of said oscillator pulses and applying a control signal to the central processor, said control circuit responding to a signal from said central processor upon completion of a transfer of data to or from the central processor to permit the passage of said oscillator pulses to said first status channel whereby, the faster input-output units are given more opportunities than the slower input-output units to transfer data to or receive data from the central processor.

2. In a data processing device wherein a plurality of input-output units may transfer data to or receive data from a central processor, the data processing device having a scan element disposed between the plurality of input-output units and the central processor, the scan element having at least first, second and third status channels serially connected, a source of oscillator pulses connected to the first status channels, each input-output device having means to supply status signals, means conveying the status signal of each input-output device to a separate status channel with status signals from the fastest input-output unit being connected to the first status channel and the status signals of succeeding slower input-output units being connected to succeeding status channels in the series, a control circuit connected between said source of oscillator pulses and said serially connected status channels which normally passes oscillator pulses to the status channels, each status channel having an output conductor connected to said control circuit which conveys a signal to the control circuit which operates the control circuit both to inhibit the passage of oscillator pulses and to supply a control signal to the central processor when any one of the status channels is ready to transfer data to or receive data from the central processor, said central processor including means for supplying a signal to the control circuit which operates the control circuit to pass oscillator pulses when a transfer of data to or from the central processor is completed, whereby the first input-output unit is interrogated first by each pulse from the oscillator and is given procedence over the second and subsequent input-output units, the second input-output unit is interrogated second by each pulse from the oscillator and is given precedence over the third and any subsequent input-output units, et cetera.

3. The apparatus of claim 2 wherein a counter and means coupled thereto are connected to said control circuit, said counter and means coupled thereto serving to inhibit the transfer of information to or from a selected input-output unit which is ready to transfer or receive data until said counter reaches a given count.

4. In a data processing device wherein a plurality of input-output units may transfer data to or receive data from a central processor, the data processing device having a scan element disposed between the plurality of input-output units and the central processor, the scan element having at least first, second and third status channels serially connected, a source of oscillator pulses connected to the first status channel, each input-output device having means to supply status signals, means conveying the status signal of each input-output device to a separate status channel with status signals from the fastest input-output unit being connected to the first status channel and the status signals of succeeding slower input-output units being connected to succeeding status channels in the series, a counter, a control circuit connected between said source of oscillator pulses and said serially connected status channels which normally passes oscillator pulses to the status channels and said counter, each status channel having an output conductor connected to said control circuit which conveys a signal to the control circuit which operates the control circuit: (*a*) to inhibit the passage of oscillator pulses, (*b*) to set the counter to a predetermined count, and (*c*) to supply a control signal to the central processor when any one of the status channels is ready to transfer data to or receive data from the central processor, means coupled between the counter and said control circuit which inhibits the occurrence of operative signals on said output conductor of each status channel until said counter reaches a given count which differs from said predetermined count, said central processor including means for supplying a signal to the control circuit which operates the control circuit to pass oscillator pulses when a transfer of data to or from the central processor is completed, whereby the first input-output unit is interrogated first by each oscillator pulse from said control circuit and is given precedence over the second and subsequent input-output units, the second input-output unit is interrogated second by each oscillator pulse from said control circuit and is given precedence over the third and any subsequent input-output units, et cetera, and any input-output unit which is ready to transfer or receive data must wait until said counter reaches said given count.

References Cited in the file of this patent

UNITED STATES PATENTS

| | | |
|---|---|---|
| 2,667,533 | Zenner | Jan. 26, 1954 |
| 2,703,338 | Stiles | Mar. 1, 1955 |
| 2,840,705 | Scully | June 24, 1958 |

OTHER REFERENCES

Publication: "Review of Input and Output Equipment Used in Computing Systems," Joint AIEE—ERE—ACM Computer Conference, March 1953 (pp. 81–85).